US012688984B2

(12) United States Patent
Tannhäuser et al.

(10) Patent No.: US 12,688,984 B2
(45) Date of Patent: Jul. 21, 2026

(54) CIRCUIT BREAKER

(71) Applicant: Siemens Aktiengesellschaft, Munich (DE)

(72) Inventors: Marvin Tannhäuser, Hausen (DE); Manfred Heindl, Alteglofsheim (DE); Jörg Hussmann, Neumarkt (DE)

(73) Assignee: Siemens Aktiengesellschaft, Munich (DE)

( * ) Notice: Subject to any disclaimer, the term of this patent is extended or adjusted under 35 U.S.C. 154(b) by 117 days.

(21) Appl. No.: 18/696,490

(22) PCT Filed: Sep. 12, 2022

(86) PCT No.: PCT/EP2022/075246

§ 371 (c)(1),
(2) Date: Mar. 28, 2024

(87) PCT Pub. No.: WO2023/052107

PCT Pub. Date: Apr. 6, 2023

(65) Prior Publication Data

US 2024/0395478 A1 Nov. 28, 2024

(30) Foreign Application Priority Data

Sep. 28, 2021 (DE) ..................... 10 2021 210 821.0

(51) Int. Cl.
*H01H 89/08* (2006.01)
*H01H 9/54* (2006.01)
(Continued)

(52) U.S. Cl.
CPC ............ *H01H 9/547* (2013.01); *H01H 71/04* (2013.01); *H01H 71/62* (2013.01)

(58) Field of Classification Search
CPC ..................................................... H01H 9/547
See application file for complete search history.

(56) References Cited

U.S. PATENT DOCUMENTS

| | | | |
|---|---|---|---|
| 4,888,661 | A | 12/1989 | Belbel et al. |
| 11,538,642 | B2 | 12/2022 | Hussmann |

(Continued)

FOREIGN PATENT DOCUMENTS

| | | | |
|---|---|---|---|
| DE | 3824116 | A1 | 1/1989 |
| DE | 102018213354 | A1 | 2/2020 |

(Continued)

*Primary Examiner* — Menatoallah Youssef
*Assistant Examiner* — Esayas G Yeshaw
(74) *Attorney, Agent, or Firm* — Laurence A. Greenberg; Werner H. Stemer; Ralph E. Locher

(57) ABSTRACT

A circuit breaker for protecting an electric low-voltage circuit has a housing with a grid-side neutral conductor connection, a grid-side phase conductor connection, and a load-side phase conductor connection for the low-voltage circuit. A mechanical isolating contact unit is connected to an electronic interruption unit in series for a phase conductor path and is paired with the load-side phase conductor connection. The electronic interruption unit is paired with the grid-side phase conductor. A current sensor unit ascertains the level of the current of the phase conductor path. A power supply unit is connected or can be connected to the grid-side neutral and phase conductor connections. A control unit is connected to the power supply unit, the current sensor unit, the mechanical isolating contact unit, and the electronic interruption unit. A process for interrupting the current flow in the phase conductor is initiated when current thresholds or current/time thresholds are exceeded.

17 Claims, 1 Drawing Sheet

(51) Int. Cl.
*H01H 71/04* (2006.01)
*H01H 71/62* (2006.01)

(56) References Cited

U.S. PATENT DOCUMENTS

| | | | | |
|---|---|---|---|---|
| 2016/0099569 | A1* | 4/2016 | Rilling | H02J 3/38<br>324/424 |
| 2020/0044441 | A1* | 2/2020 | Carty | H02H 9/005 |
| 2021/0066013 | A1 | 3/2021 | Kumar et al. | |
| 2022/0224101 | A1* | 7/2022 | Jhaveri | H02H 1/0092 |
| 2022/0328273 | A1* | 10/2022 | Vaghasiya | H02J 13/00004 |
| 2022/0337046 | A1 | 10/2022 | Erven | |
| 2024/0404764 | A1* | 12/2024 | Tannhäuser | H01H 9/548 |
| 2024/0404765 | A1* | 12/2024 | Tannhäuser | H01H 9/548 |

FOREIGN PATENT DOCUMENTS

| | | | |
|---|---|---|---|
| DE | 102019213604 | A1 | 3/2021 |
| WO | 2015086437 | A1 | 6/2015 |
| WO | 2022243419 | A1 | 11/2022 |

* cited by examiner

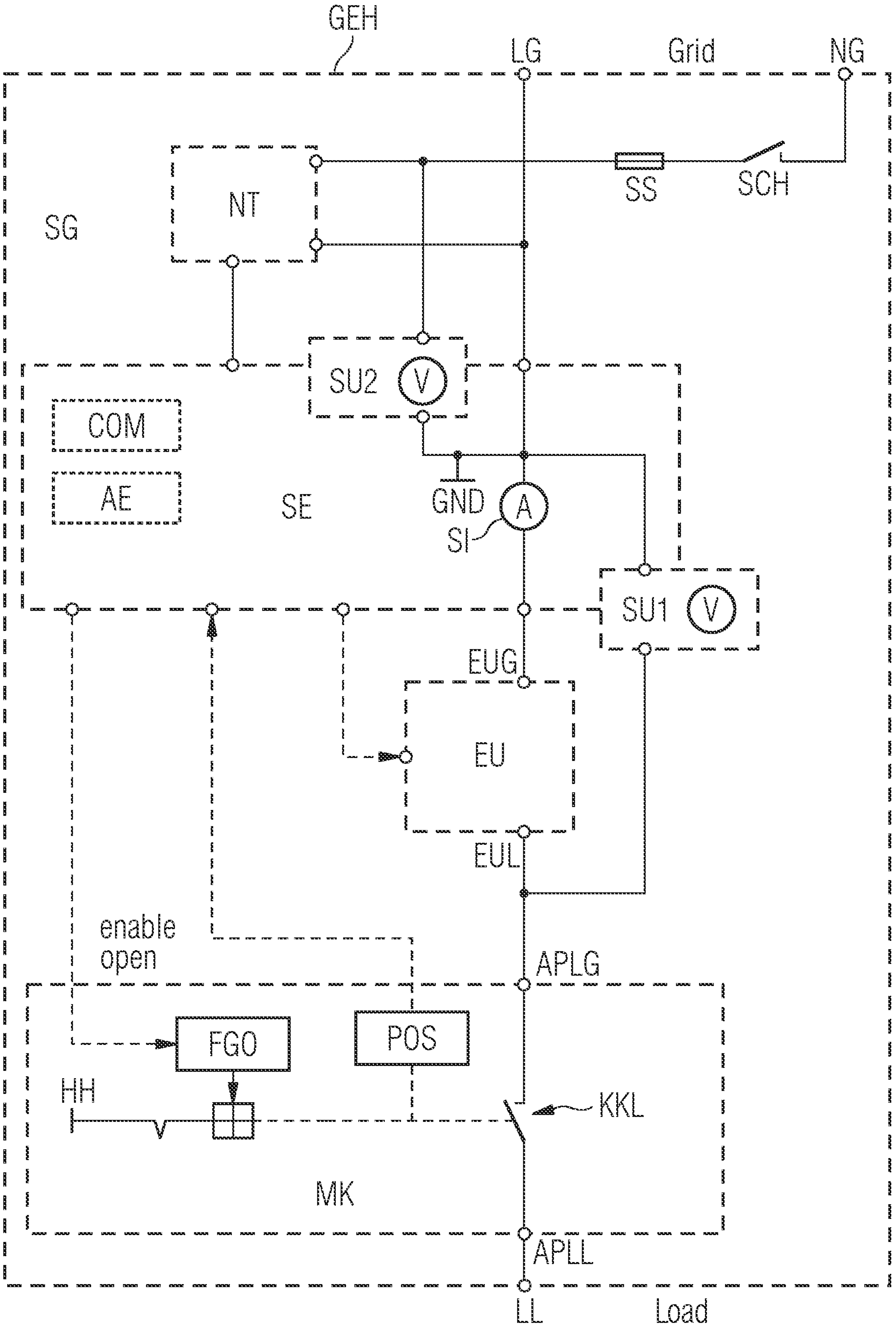
GEH
LG
Grid
NG
NT
SS
SCH
SG
SU2
V
COM
AE
SE
GND
A
SI
SU1
V
EUG
EU
EUL
enable
open
APLG
FGO
POS
HH
KKL
MK
APLL
LL
Load

CIRCUIT BREAKER

FIELD AND BACKGROUND OF THE INVENTION

The invention relates to the technical field of a circuit breaker device for a low-voltage circuit having an electronic interruption unit.

Low voltage is used to mean voltages of up to 1000 volts AC or up to 1500 volts DC. Low voltage is used to mean, in particular, voltages which are greater than extra-low voltage, with values of 50 volts AC or 60 volts DC.

A low-voltage circuit or grid or installation is used to mean circuits with nominal currents or rated currents of up to 125 amperes, more specifically up to 63 amperes. A low-voltage circuit is used to mean, in particular, circuits with nominal currents or rated currents of up to 50 amperes, 40 amperes, 32 amperes, 25 amperes, 16 amperes or 10 amperes. Said current values are used to mean, in particular, nominal, rated or/and shutdown currents, that is to say the maximum current which is normally carried through the circuit or in the case of which the electrical circuit is usually interrupted, for example by means of a protective device, such as a circuit breaker device, a circuit breaker or a power switch. The nominal currents can be grouped further, from 0.5 A over 1 A, 2 A, 3 A, 4 A, 5 A, 6 A, 7 A, 8 A, 9 A, 10 A, etc. up to 16 A.

Circuit breakers are overcurrent protective devices which have been known for a long time and are used in electrical installation technology in low-voltage circuits. They protect lines from damage caused by heating as a result of an excessively high current and/or a short circuit. A circuit breaker can automatically shut down the circuit in the event of an overload and/or a short circuit. A circuit breaker is a fuse element which does not automatically reset. In contrast to circuit breakers, power switches are intended for currents of greater than 125 A, sometimes even already starting from 63 amperes. Circuit breakers therefore have a simpler and more delicate design. Circuit breakers usually have a fastening option for fastening to a so-called top-hat rail (carrier rail, DIN rail, TH35).

Circuit breakers have an electromechanical design. In a housing, they have a mechanical switching contact or shunt opening release for interrupting (tripping) the electrical current. A bimetallic protective element or bimetallic element is usually used for tripping (interruption) in the event of a sustained overcurrent (overcurrent protection) or in the event of a thermal overload (overload protection). An electromagnetic release having a coil is used for short-term tripping if an overcurrent limit value is exceeded or in the event of a short circuit (short circuit protection). One or more arc quenching chambers or arc quenching devices are provided. Connection elements for conductors of the electrical circuit to be protected are also provided.

Circuit breaker devices having an electronic interruption unit are relatively new developments. They have a semiconductor-based electronic interruption unit. That is to say, the electrical current flow in the low-voltage circuit is guided via semiconductor components or semiconductor switches which can interrupt the electrical current flow or can be switched to be conductive. Circuit breaker devices having an electronic interruption unit also often have a mechanical isolating contact system, in particular with isolator properties according to relevant standards for low-voltage circuits, wherein the contacts of the mechanical isolating contact system are connected in series with the electronic interruption unit, that is to say the current in the low-voltage circuit to be protected is guided both via the mechanical isolating contact system and via the electronic interruption unit.

SUMMARY OF THE INVENTION

The problem of the present invention is to improve a circuit breaker device of the type mentioned at the beginning, in particular to specify a new, simple and improved architecture for such a circuit breaker device.

This problem is solved by a circuit breaker device having the features as claimed.

The invention proposes a circuit breaker device for protecting an electrical low-voltage circuit, in particular a low-voltage AC circuit, comprising:

- a housing having a grid-side neutral conductor connection, a grid-side phase conductor connection, and a load-side phase conductor connection for the low-voltage circuit; a load-side neutral conductor connection in particular is not provided,
- an, in particular single-pole, mechanical isolating contact unit which is connected in series with an, in particular single-pole, electronic interruption unit for a phase conductor path, wherein the mechanical isolating contact unit is connected to the load-side phase conductor connection, and the electronic interruption unit is connected to the grid-side phase conductor connection,
- that is to say the electronic interruption unit is constantly connected to the grid-side connection and there is always a voltage there in the normal state,
- a current sensor unit for ascertaining the level of the current of the phase conductor path,
- a power supply unit which is connected or can be connected to the grid-side neutral conductor connection and the grid-side phase conductor connection;
- a control unit which is connected to the power supply unit, the current sensor unit, the mechanical isolating contact unit and the electronic interruption unit (EU), wherein the circuit breaker device is designed such that a process for interrupting the current flow in the phase conductor is initiated if current threshold values or current/time threshold values in the phase conductor are exceeded.

The invention proposes a circuit breaker device which interrupts in a single-pole manner, that is to say interrupts one conductor or one (current) path, and which has a two-pole grid-side connection and a single-pole load-side connection. Only the phase conductor is monitored, protected and, where necessary, interrupted. The grid-side neutral conductor connection is used to supply energy to the circuit breaker device and to measure the voltage of the low-voltage circuit. The mechanical isolating contact unit is also provided at the load-side connection. The electronic interruption unit is provided at the grid-side connection. In this case, there is always a voltage applied in the normal case. The power supply unit is always supplied with energy/voltage in the normal case, such that the electronic interruption unit, where appropriate the current sensor unit, is always operationally ready and can monitor the current path/phase conductor path. According to the invention, there is therefore a very simple architecture for a circuit breaker device having an electronic interruption unit.

The phase conductor path can be interrupted by way of the electronic interruption unit, the mechanical isolating contact unit, or both units.

Advantageous configurations of the invention are specified in the dependent claims and in the exemplary embodiment.

In one advantageous configuration of the invention, the mechanical isolating contact unit has a contact such that it is possible to switch between opening the contact in order to prevent a flow of current or closing the contact for a flow of current in the phase conductor path. In one advantageous configuration, the mechanical isolating contact unit has a handle for manually opening and closing the contact.

This has the particular advantage that, by means of the handle, a circuit breaker device which is equivalent to conventional circuit breakers is provided or the functionality of a conventional circuit breaker is provided.

In one advantageous configuration of the invention, the mechanical isolating contact unit is designed such that a contact can be opened, but not closed, by the control unit. In particular, if the process of opening the contacts is initiated by the control unit, this cannot be blocked by the handle (this is referred to as a so-called trip-free release).

This has the particular advantage that an increased level of operational safety is achieved since the contacts cannot be closed inadvertently by the control unit.

In one advantageous configuration of the invention, the mechanical isolating contact unit is designed in such a way that closing of the contact by way of a handle is possible only in the presence of an enable signal.

This has the particular advantage that an increased level of operational safety in the circuit and the circuit breaker device is achieved since only a functional circuit breaker device enables closure of the contact.

In one advantageous configuration of the invention, the mechanical isolating contact unit is designed in such a way that a piece of position information about the closed or open state of the contacts is available, in particular in that the piece of position information is captured by the control unit.

This has the particular advantage that the control unit can detect the switching state of the mechanical isolating contact unit.

In one advantageous configuration of the invention, the mechanical isolating contact unit is designed in such a way that a mechanical indication of the position of the contacts (open or closed) provided, in particular in that said indication is independent of the supply voltage.

In one advantageous configuration of the invention, a first voltage sensor unit is provided to ascertain the level of the voltage across the two connections of the electronic interruption unit.

This has the particular advantage that the ascertainment of the functionality of the electronic interruption unit can advantageously be supported easily by the ascertainment of the level of the voltage across the electronic interruption unit. An increased level of operational security of a circuit breaker device is therefore achieved since a faulty electronic interruption unit can be identified easily and, where necessary, the circuit breaker device can be interrupted.

In one advantageous configuration of the invention, a second voltage sensor unit is provided to ascertain the level of the voltage between the grid-side neutral conductor connection and the grid-side phase conductor connection.

This has the particular advantage that the voltage of the grid-side connection can be monitored and, where necessary, the circuit can be isolated. An increased level of operational safety of the circuit breaker device and in the circuit is therefore achieved.

In one advantageous configuration of the invention, a switch or/and a fuse is provided in the connection between the grid-side neutral conductor connection and the power supply unit or the grid-side phase conductor connection and the power supply unit.

The switch is advantageously designed in such a way that the switch can only be opened when the contacts of the mechanical isolating contact unit are open. This increases safety in the device since the electronics cannot be shut down when the contacts are closed.

This has the particular advantage that the power supply unit and the control unit can be shut down, for example for isolation measurements. Furthermore, the power supply unit and the control unit can be secured by way of a fuse in order to achieve increased safety in the circuit breaker device with respect to other faults.

In one advantageous configuration of the invention, a display unit which is connected to the control unit is provided. In particular, a high-impedance or low-impedance state of the switching elements of the electronic interruption unit is displayed.

This has the particular advantage that a display of status information about the circuit breaker device is made possible.

In one advantageous configuration of the invention, a communication unit which is connected to the control unit is provided.

This has the particular advantage that communication of status information to other circuit breaker devices or to a superordinate management system is made possible.

In one advantageous configuration of the invention, a temperature sensor unit is provided, in particular to ascertain the temperature of the electronic interruption unit.

This has the particular advantage that further protection against overheating and, as a result, melting of the semiconductor-based switching elements of the electronic interruption unit is provided. An increased current-carrying capability can also be achieved.

The current path/phase conductor path can be interrupted if at least one temperature threshold value is exceeded.

In one advantageous configuration of the invention, the electronic interruption unit can be switched, by way of semiconductor-based switching elements, to a high-impedance state of the switching elements in order to prevent a flow of current or to a low-impedance state of the switching elements for the flow of current in the low-voltage circuit. The semiconductor-based switching elements may be, for example, normally off components, such as transistors, IGBTs, MOSFETs, etc.

This has the particular advantage that, in the case of normally off transistors, the electronic interruption unit is high-impedance in the case of a loss of voltage. An increased level of operational safety is therefore achieved.

In one advantageous configuration of the invention, the low-voltage circuit is a three-phase AC circuit and the circuit breaker device has further grid-side and load-side phase conductor connections, between each of which a series circuit composed of a further contact of the mechanical isolating contact unit and electronic interruption units is connected, wherein further current sensor units are provided to ascertain the level of the respective phase conductor. It is also possible to provide further first or/and second voltage sensor units.

This has the particular advantage that a solution for three-phase AC circuits is provided.

In one advantageous configuration of the invention, when the contacts of the mechanical isolating contact unit and the low-impedance interruption unit are closed and

- when a current which exceeds the first current value is ascertained, in particular the first current value is exceeded for a first time limit, the electronic interruption unit comes to have a high impedance and the mechanical isolating contact unit remains closed, when a current which exceeds a second current value is ascertained, in particular for a second time limit, the electronic interruption unit comes to have a high impedance and the mechanical isolating contact unit is opened, when a current which exceeds a third current value is ascertained, the electronic interruption unit comes to have a high impedance and the mechanical isolating contact unit is opened.

This is the particular advantage that a graded shutdown concept for a circuit breaker device is provided.

In one advantageous configuration of the invention, the control unit has a microcontroller.

This has the particular advantage that the functions according to the invention for increasing the safety of a circuit breaker device and the electrical low-voltage circuit to be protected can be realized by an (adaptable) computer program product. Furthermore, changes and improvements to the function can be loaded individually onto a circuit breaker device.

All embodiments, both in dependent form referring back to an independent claims and referring back only to individual features or combinations of features of patent claims, bring about an improvement in a circuit breaker device, in particular a new architecture and improvement in the safety of a circuit breaker device or the electrical circuit, and provide a new concept for a circuit breaker device.

The described properties, features and advantages of this invention and the way in which they are achieved will become clearer and more clearly comprehensible in connection with the following description of the exemplary embodiments, which are explained in more detail in connection with the drawing.

BRIEF DESCRIPTION OF THE FIGURE

The FIGURE shows a basic illustration of a circuit breaker device.

DETAILED DESCRIPTION OF THE INVENTION

The FIGURE shows an illustration of a circuit breaker device SG for protecting an electrical low-voltage circuit, in particular a low-voltage AC circuit, comprising a housing GEH having a grid-side neutral conductor connection NG, a grid-side phase conductor connection LG, and a load-side phase conductor connection LL for the low-voltage circuit;

an energy source is usually connected on the grid side GRID, a consumer is usually connected on the load side LOAD;

the consumer on the load side LOAD is connected on the other side to the neutral conductor of the low-voltage circuit by means of a conductor connection which is not guided through the circuit breaker device SG; for example, the consumer can be connected (on the other side) to the grid-side neutral conductor connection NG, a (single-pole) mechanical isolating contact unit MK having a load-side connection point APLL and a grid-side connection point APLG, the load-side connection point APLL and the grid-side connection point APLG are provided for the phase conductor of the low-voltage circuit;

the load-side connection point APLL is connected to the load-side phase conductor connection LL such that it is possible to switch between opening the contact KKL in order to prevent a flow of current or closing the contact KKL for a (potential) flow of current in the low-voltage circuit, a (single-pole) electronic interruption unit EU, having a grid-side connecting point EUG, which is electrically connected to the grid-side phase conductor connection LG, and a load-side connecting point EUL which is connected to the grid-side connection point APLG of the mechanical isolating contact unit MK, wherein the electronic interruption unit can be switched, by way of semiconductor-based switching elements, to a high-impedance state of the switching elements in order to prevent a flow of current or to a low-impedance state of the switching elements for the flow of current in the low-voltage circuit, a current sensor unit SI for ascertaining the level of the current of the low-voltage circuit which is arranged in the phase conductor or the phase conductor path, a power supply unit NT which is connected or can be connected to the grid-side neutral conductor connection NG and the grid-side phase conductor connection LG. A switch or/and a fuse is provided in the connection between the grid-side neutral conductor connection and the power supply unit or the grid-side phase conductor connection and the power supply unit. In the example according to the FIGURE, a series circuit composed of a fuse SS (in particular a fusible melt) and a switch SCH is provided in the connection between the grid-side neutral conductor connection NG and the power supply unit NT. The connection is therefore secured from overcurrents or short circuits on the one hand and can be disconnected by means of the switch on the other hand.

a control unit SE which is connected to the power supply unit NT, the current sensor unit SI, the mechanical isolating contact unit MK and the electronic interruption unit EU, wherein a process for preventing a flow of current in the low-voltage circuit is initiated if current threshold values or/and current/time threshold values are exceeded. The prevention of the flow of current can be carried out by the electronic interruption unit EU, the mechanical isolating contact unit MK or/and both units.

A first and a second voltage sensor unit SU1, SU2 are also provided. In the example according to the FIGURE, a first voltage sensor unit SU1 which is connected to the control unit SE and which ascertains the level of the voltage between the grid-side connecting point EUG and the load-side connecting point EUL of the electronic interruption unit EU is provided.

The voltage measurement by means of the first voltage sensor unit SU1 may alternatively also involve the voltage across the series circuit of the electronic interruption unit EU and the current sensor unit SI being ascertained, as illustrated in the FIGURE. The current sensor unit SI has a very low internal resistance, such that the ascertainment of the level of the voltage is not impaired or any impairment is negligible.

A second voltage sensor unit which ascertains the level of the voltage between the grid-side neutral conductor connection NG and the grid-side phase conductor connection LG can advantageously be provided, as illustrated in the FIGURE.

The circuit breaker device SG is advantageously designed in such a way that the contacts of the mechanical isolating contact unit MK are opened by the control unit SE, for example by way of an opening signal open, but cannot be closed, which is indicated by an arrow from the control unit SE to the mechanical isolating contact unit MK and the opening signal open.

The mechanical isolating contact unit MK can be operated (from the outside by a user) by way of a mechanical handle HH on the circuit breaker device SG in accordance with the FIGURE in order to switch between manually (by hand) opening or closing of the contact KKL. The mechanical handle HH indicates the switching state (open or closed) of the contact of the mechanical isolating contact unit MK on the circuit breaker device.

Furthermore, the contact position (or the position of the handle, closed or open) may the able to be transmitted to the control unit SE. The contact position (or the position of the handle) can be ascertained, for example, by means of a sensor. A position sensor POS may be provided for this purpose, as illustrated in the FIGURE. Said position sensor POS is connected to the control unit SE.

The mechanical isolating contact unit MK is advantageously designed in such a way that (manual) closing of the contact by way of the mechanical handle is possible only after enabling, in particular an enable signal enable. This is likewise indicated by the arrow from the control unit SE to the mechanical isolating contact unit MK, by the enable signal enable. That is to say the contact KKL of the mechanical isolating contact unit MK can be closed (by the control unit) by means of the handle HH only in the presence of the enabling or the enable signal enable. Without the enabling or the enable signal enable, the handle HH can be actuated but the contacts cannot be closed ("permanent slider contacts").

The energy supply or the power supply unit NT is provided in particular for the control unit SE, which is indicated in the FIGURE by a connection between the power supply unit NT and the control unit SE.

The circuit breaker device SG may have a display unit AE, according to the FIGURE, which is connected to the control unit SE for displaying switching states of the circuit breaker device SG, in particular of the electronic interruption unit EU.

The circuit breaker device SG may have a communication unit COM, according to the FIGURE, which is connected to the control unit SE for communication with other circuit breaker devices or/and a superordinate management system, in particular for communicating switching states and measurement values of or information about the circuit breaker device.

The circuit breaker device SG may have a temperature sensor device (not illustrated), in particular for ascertaining the temperature of the electronic interruption unit or the semiconductor-based switching elements thereof.

The control unit SE may have a microcontroller in order to execute the protective function of the circuit breaker device.

The circuit breaker device may have a graded shutdown concept, such that a differentiated shutdown (electronic interruption unit/mechanical isolating contact unit or both units) can be carried out at particular current threshold values or current/time threshold values, that is to say if a current value is present for a particular time limit.

The low-voltage circuit may be a three-phase AC circuit, having a neutral conductor and three phase conductors. The circuit breaker device may be designed for this purpose as a three-phase variant and may have, for example, further grid-side and load-side phase conductor connections. A respective series circuit composed of an electronic interruption unit and a contact is provided in an analogous manner between the further grid-side and load-side phase conductor connections. Corresponding voltage determination processes can also be provided (for example by way of first and second voltage sensor units).

High-impedance is meant to refer to a state in which only a current with a negligible magnitude flows. In particular, high-impedance is meant to refer to resistance values that are greater than 1 kiloohm, preferably greater than 10 kiloohms, 100 kiloohms, 1 megaohm, 10 megaohms, 100 megaohms, 1 gigaohm or greater.

Low-impedance is meant to refer to a state in which the current value specified on the circuit breaker device could flow. In particular, low-impedance is meant to refer to resistance values that are lower than 10 ohms, preferably lower than 1 ohm, 100 milliohms, 10 milliohms, 1 milliohm or lower.

The (single-pole) mechanical isolating contact unit MK and the (single-pole) electronic interruption unit EU are connected in series and form a phase conductor path, that is to say a path for the phase conductor through the circuit breaker device SG (inside the housing). The mechanical isolating contact unit MK is assigned to the load-side (consumer-side) phase conductor connection. The electronic interruption unit EU is assigned to the grid-side (energy-source-side) phase conductor connection.

In the case of a fault in the electronics (control unit or/and electronic interruption unit) which are present, the circuit breaker device identifies the fault and switches the device to a safe state.

a) the fault in the electronics is detected.

b) the device switches the power semiconductor off (high-impedance).

c) the device opens the mechanical isolating contact. The latching mechanism is in an off state and it is not possible to switch on by means of the mechanical actuating system/handle.

d) the fault case is reported by means of the communication unit COM.

The invention proposes an expedient arrangement of all of the necessary components for a circuit breaker device which provides protection in a single-pole manner for the purpose of safe operation of the circuit breaker device.

Although the invention has been described and illustrated more specifically in detail by means of the exemplary embodiment, the invention is not restricted by the disclosed examples and other variations may be derived therefrom by a person skilled in the art without departing from the scope of protection of the invention.

The invention claimed is:

1. A circuit breaker device for protecting an electric low-voltage circuit, comprising:

a housing having a grid-side neutral conductor connection, a grid-side phase conductor connection, and a load-side phase conductor connection for the low-voltage circuit;

a mechanical isolating contact unit connected in series with an electronic interruption unit for a phase conductor path, said mechanical isolating contact unit being connected to said load-side phase conductor connection, and said electronic interruption unit being connected to said grid-side phase conductor connection;

a current sensor unit for ascertaining a level of a current of the phase conductor path;

a first voltage sensor unit for ascertaining a level of a voltage across two connections of said electronic interruption unit;

a power supply unit connected, or to be connected, to said grid-side neutral conductor connection and to said grid-side phase conductor connection;

a control unit connected to said power supply unit, to said current sensor unit, to said mechanical isolating contact unit, and to said electronic interruption unit, and wherein a process for interrupting a current flow in the phase conductor is initiated when the current in the phase conductor exceeds a threshold value or a current/time threshold value; and said electronic interruption unit being configured to be switched, via semiconductor-based switching elements, to a high-impedance state of the switching elements to prevent a flow of current or to a low-impedance state of the switching elements for the flow of current in the low-voltage circuit.

2. The circuit breaker device according to claim 1, wherein said mechanical isolating contact unit comprises:

a contact for enabling a switching between opening the contact in order to prevent a flow of current or closing the contact for a flow of current in the phase conductor path; and a handle for manually opening and closing the contact.

3. The circuit breaker device according to claim 2, wherein said mechanical isolating contact unit is configured to enable said contact to be opened, but not closed, by the control unit.

4. The circuit breaker device according to claim 2, wherein said mechanical isolating contact unit is configured to enable a closing of said contact by way of a handle only when an enable signal is present.

5. The circuit breaker device according to claim 1, wherein said mechanical isolating contact unit is configured to make available an item of position information about a closed state or an open state of the contacts.

6. The circuit breaker device according to claim 5, wherein said control unit is connected to receive the item of position information about the closed state.

7. The circuit breaker device according to claim 1, further comprising a second voltage sensor unit for ascertaining a level of a voltage between said grid-side neutral conductor connection and said grid-side phase conductor connection.

8. The circuit breaker device according to claim 1, further comprising at least one of a switch or a fuse disposed in a connection between said grid-side neutral conductor connection and said power supply unit or between said grid-side phase conductor connection and said power supply unit.

9. The circuit breaker device according to claim 1, further comprising a display unit connected to said control unit.

10. The circuit breaker device according to claim 1, further comprising a communication unit connected to said control unit.

11. The circuit breaker device according to claim 1, further comprising a temperature sensor unit.

12. The circuit breaker device according to claim 11, wherein said temperature sensor unit is configured to ascertain a temperature of said electronic interruption unit.

13. The circuit breaker device according to claim 1, wherein said electronic interruption unit is configured to be switched, by way of semiconductor-based switching elements, to a high-impedance state of said switching elements in order to prevent a flow of current or to a low-impedance state of said switching elements for a flow of current in the low-voltage circuit.

14. The circuit breaker device according to claim 1, wherein the low-voltage circuit is a three-phase AC circuit and the circuit breaker device comprises further grid-side and load-side phase conductor connections, between each of which there is connected a series circuit formed of a further contact of said mechanical isolating contact unit and electronic interruption units, and wherein further current sensor units are provided to ascertain a level of the respective phase conductor.

15. The circuit breaker device according to claim 1, wherein:

when contacts of said mechanical isolating contact unit are closed and said interruption unit is at low impedance; and when a current is ascertained which exceeds a first current value, said electronic interruption unit comes to have a high impedance and said mechanical isolating contact unit remains closed;

when a current is ascertained which exceeds a second current value, said electronic interruption unit comes to have a high impedance and said mechanical isolating contact unit is opened;

when a current is ascertained which exceeds a third current value, said electronic interruption unit comes to have a high impedance and said mechanical isolating contact unit is opened.

16. The circuit breaker device according to claim 1, wherein:

when the current exceeds a first current value for a first time limit, said electronic interruption unit comes to have a high impedance and said mechanical isolating contact unit remains closed;

when the current exceeds a second current value for a second time limit, said electronic interruption unit comes to have a high impedance and said mechanical isolating contact unit is opened.

17. The circuit breaker device according to claim 1, wherein said control unit has a microcontroller.

* * * * *